(No Model.)
W. SWEET.
WASHING MACHINE.
No. 531,576. Patented Dec. 25, 1894.
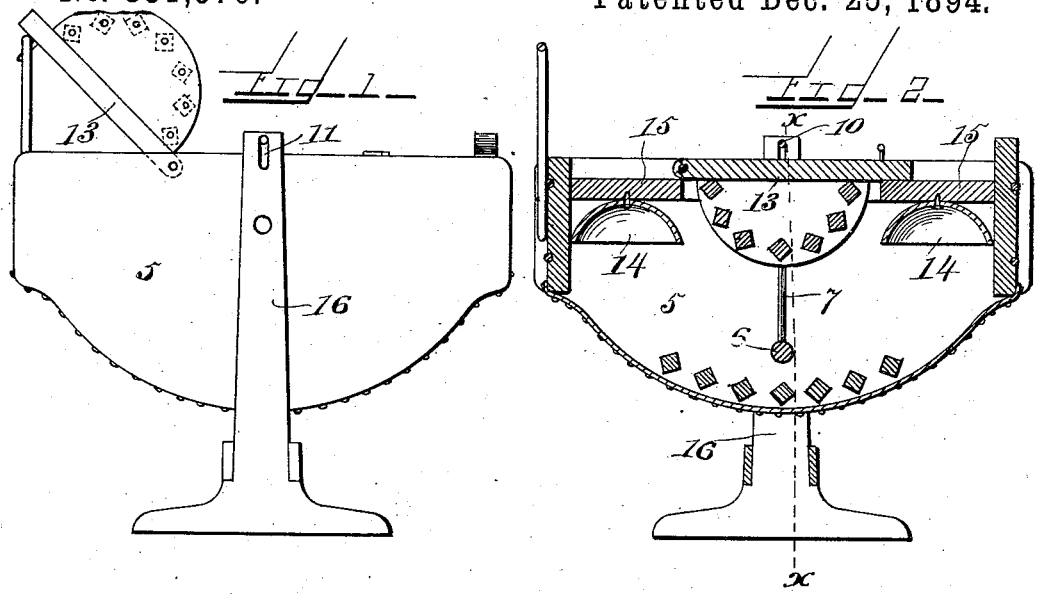
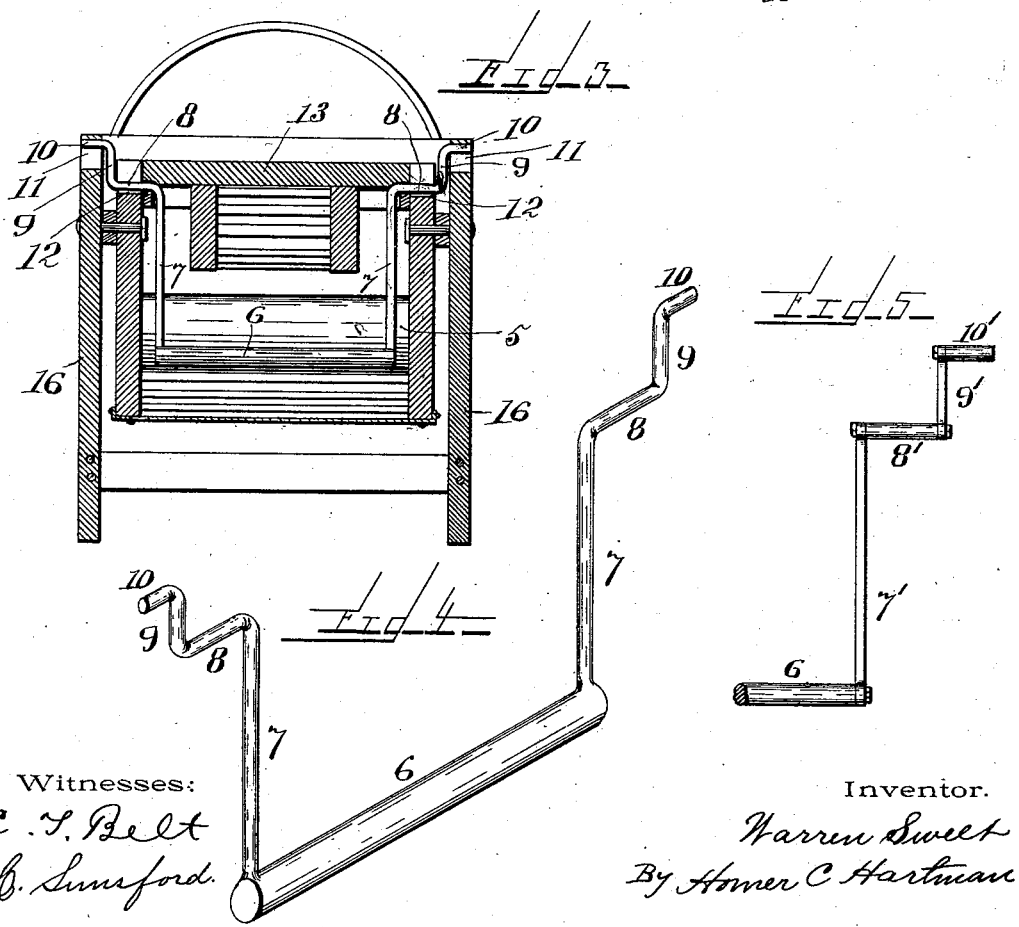
Witnesses:
C. T. Belt
C. Lunsford.
Inventor.
Warren Sweet
By Homer C Hartman
Attorney.

UNITED STATES PATENT OFFICE.

WARREN SWEET, OF FORT WAYNE, INDIANA.

WASHING-MACHINE.

SPECIFICATION forming part of Letters Patent No. 531,576, dated December 25, 1894.

Application filed December 18, 1893. Serial No. 493,898. (No model.)

*To all whom it may concern:*

Be it known that I, WARREN SWEET, a citizen of the United States, residing at Fort Wayne, in the county of Allen, in the State of Indiana, have invented certain new and useful Improvements in Washing-Machines; and I do hereby declare that the following is a full, clear, and exact description of the invention, which will enable others skilled in the art to which it appertains to make and use the same, reference being had to the accompanying drawings, which form part of this specification.

My invention relates to improvements in washing machines, of the class known as "rocking and swinging," in which the suds vessel is mounted in a frame in which it is oscillated; and its objects are, to provide improved means to operate automatically a rubber or agitator, within a closed suds vessel, alternately in opposite directions to the motion of the bottom of the suds vessel, by the oscillation of the vessel; and also to provide improved means for subjecting the clothes to the action of the water; and the invention consists in the construction and novel combination of parts hereinafter described, pointed out in the appended claim and illustrated in the accompanying drawings, in which—

Figure 1 is a side elevation of a washing machine embodying my invention. Fig. 2 is a longitudinal sectional view. Fig. 3 is a cross section taken on the plane indicated by the dotted lines $x$—$x$ in Fig. 2. Fig. 4 is an enlarged perspective view of the rubber and the operating lever; and Fig. 5 is a modified form of the rubber partly broken away and its arms and journals, showing the parts in separate pieces.

The construction is as follows: Illustrating the device by its application to a suds vessel mounted on pivots in a frame for oscillation, the rubber or agitator 6 is of any suitable form, size and shape, and is placed below the center of the arc of oscillation. In practice I have found that a straight rod, as shown in the drawings, preferably answers the purpose; but I do not confine myself to such specific construction. The device is applicable to any suitable rubber. To the ends of the rubber or agitator, I attach arms 7 which extend up near to the top of the suds vessel, above the center of the arc of oscillation. At this point horizontal journals 8 are attached to the upper ends of the arms, which journals rest in bearings 12 formed in the sides of the box. These bearings are placed above the center of the arc of oscillation of the suds vessel. To the outside ends of these horizontal journals 8, short arms 9 are attached which extend upward from their point of connection. To the ends of these short arms horizontal projections 10 are attached which move up and down, and are held in vertical line by and within slots 11 made in the standards 16. The rubber or agitator 6, arms 7, horizontal journals 8, short arms 9, and horizontal projections 10, are preferably made integrally, and are preferably formed from one piece of round metal as shown in Fig. 4; but these parts may be made separately, and separately joined together, as shown in Fig. 5, in which the rubber is number 6', the lower arm of lever number 7', the horizontal journal number 8', the upper short arm extending outside of the suds vessel number 9', and the projection which engages the slot of the standard number 10'. Thus constructed and placed, the agitator is moved forward and backward by the levers operated on by the oscillation of the suds vessel; the power being applied by the suds box to the horizontal journals 8, the projection 10 on the short arms acting as fulcrum points, and the weight moved being the agitator 6 carrying and rubbing the clothes.

It will be seen that when the suds vessel 5 is oscillated, the bottom of the suds vessel moves in one direction, while the rubber or agitator is moved, as described, in an opposite direction alternately, carrying and rubbing the clothes against the corrugations on the bottom of the suds vessel and the corrugations of the lid 13.

The construction also provides that when the lid 13 is secured in place, it impinges against the horizontal journals 8 so as to form a closed bearing, and holds the journals in place; and this is my preferable construction. The standards 16 extend up above the suds box at suitable distances, so that slots 11 may be made in their ends at a sufficient height above the journals 8 to afford a proper distance for the operation of the lever as described.

The operation is obvious from the description.

Having thus described my invention, what I claim as new, and desire to secure by Letters Patent, is—

In a washing machine of the class named having a close cover or lid to retain the heat and steam; a rubber or agitator placed within the suds vessel below the center of the arc of oscillation and near its bottom; levers attached to the rubber or agitator at each end, extended therefrom upward above the center of the arc of oscillation of the suds vessel, thence at right angles through the sides of the suds vessel, thence upward outside the suds vessel and provided with projections at their upper ends extending into slots in the standards of the frame.

In testimony whereof I hereunto subscribe my name, in the presence of two witnesses, this 12th day of December, A. D. 1893.

WARREN SWEET.

Witnesses:
H. C. HARTMAN,
HELEN C. COOLICAN.